Patented Oct. 29, 1940

2,219,280

UNITED STATES PATENT OFFICE 2,219,280

DYESTUFFS AND PROCESS OF MAKING SAME

Charles Graenacher, Riehen, and Richard Sallmann, Bottmingen, Switzerland, assignors to the firm Society of Chemical Industry in Basle, Basel, Switzerland No Drawing. Application May 26, 1939, Serial No. 276,025. In Switzerland May 31, 1938

22 Claims. (Cl. 260—156)

This invention relates to the manufacture of valuable dyestuffs by producing according to known methods dyestuffs of the general formula

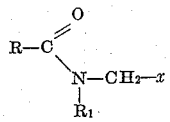

wherein R is the residue of a dyestuff, $R_1$ is a member selected from the group consisting of hydrogen and alkyl, and $x$ is a radical determining the solubility of the product in water and linked to the —$CH_2$—group by a hetero-atom.

Dyestuffs belonging to various classes of dyestuffs may be used for the present invention. Particularly valuable are those dyestuffs with the atom grouping

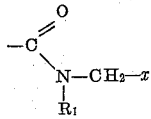

wherein, $x$ has the signification defined in the preceding paragraph and $R_1$ stands for hydrogen or an alkyl radical, substituted if desired, which are derived from azo dyestuffs, for example hydroxyazo dyestuffs, aminoazo dyestuffs having tertiary amino-groups, azo dyestuffs containing pyrazolone rings, or from anthraquinone dyestuffs. An example of an azo dyestuff having a tertiary amino-group which may be used as parent material for the present invention is the azo dyestuff from diazotized meta-aminobenzamide, and methylketol.

As groups determining the solubility of the dyestuff in water there may be named onium-groups, for instance quaternary ammonium groups or ternary sulfonium groups, further amino and imino groups in the form of salts, for example thiourea residues, further carboxylic acid, sulfonic acid, thiosulfuric acid and sulfuric acid ester groups.

By the expression "hetero-atoms" there are to be understood as usual such atoms which are different from carbon atoms and which may be a member of a hetero-cycle, as is the case with oxygen, sulfur or nitrogen. The hetero-atoms oxygen, sulfur and nitrogen may also be defined as atoms of elements contained in the 5th and 6th group of the periodic system of the elements, the atomic weight of which is not higher than 32 and is practically an even number. The expession "practically" means in this case that the atomic weights round off to even numbers may be used for practical purposes instead of the exact values.

If the dyestuffs used as parent materials contain already a carboxylic acid amide group having at least one free hydrogen atom, they may be converted into a group

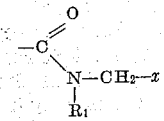

namely into the group

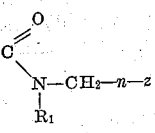

wherein $R_1$ stands for hydrogen or alkyl, $n$ stands for a quaternary nitrogen atom and $z$ stands for a monovalent anion, by treatment with salts of tertiary amines or with addition products of tertiary amines to tertiary amines, or with organic anhydrides to tertiary amines, or with mixtures of tertiary amines and organic carboxylic acid anhydrides, as well as with formaldehyde, if desired in the presence of free tertiary amines. The N-methylol carboxylic acid amides obtainable in known manner may be caused to react with salts or addition products of tertiary amines so as to form quaternary ammonium salts, preferably in the presence of free tertiary amines.

As tertiary amines for the reactions indicated in the foregoing paragraph there may be named for example trimethylamine, triethylamine, diethylcyclohexylamine, dimethylaniline, pyridine, C-alkylpyridine, or quinoline. Among the salts of the tertiary amines proposed in the last preceding paragraph there are suitable for the receding paragraph there are suitable for the reaction for example pyridinehydrochloride, pyridinehydrobromide, pyridine - metanitrobenzene sulfonate and pyridine oxalate. As addition products of inorganic anhydrides those made from sulfurdioxide or sulfurtrioxide come into question. Formaldehyde is used preferably in its polymeric modification, for example paraformaldehyde. The reactions cited in the last preceding paragraph are preferably conducted with moderate heating, for example to 50-100° C. When solid materials are being treated it is preferable to add a solvent such as benzene, toluene or an excess of free tertiary amine.

A further possibility for converting a carboxylic acid amide group containing at least one free hydrogen atom already present in the dyestuffs to be used as parent materials into a group of the general formula

namely into the group

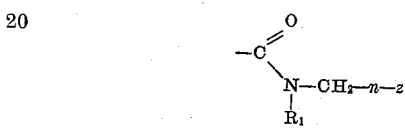

wherein $R_1$, $n$ and $z$ have the signification stated in the last paragraph but one, consists in transforming the carboxylic acid amide into the group

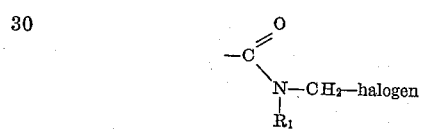

and then allowing a tertiary amine, for example a tertiary amine named in the last preceding paragraph, to react with this group. The halogen compounds necessary for this reaction are obtainable in known manner from the carboxylic acid amides having at least one hydrogen atom at the nitrogen atom of the carboxylic acid amide group, by means of hydrogen halides and formaldehyde. This reaction is preferably conducted in the presence of a solvent, for instance, benzene. It is to be recommended that water produced during the reaction should be continuously removed, for example as an azeotropic mixture with the solvent or with aid of a substance that unites with water, for instance anhydrous magnesium sulfate. For example the amide and the para-formaldehyde may be suspended in boiling benzene and hydrogen chloride introduced, the eliminated water being distilled in admixture with benzene. The union of the halogen methyl compound with the tertiary amine may be procured in known manner, for instance by allowing them to stand together at room temperature or while moderately heating.

A further possibility for converting a carboxylic acid amide group containing at least one free hydrogen atom already present in the dyestuffs to be used as parent materials, into a group of the general formula

namely into the group

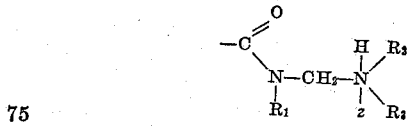

wherein $R_1$ is hydrogen or alkyl,

is the radical of a secondary base and $z$ is a monovalent anion, consists in transforming the carboxylic acid amide group in known manner into the N-methylol-carboxylic acid amide group, allowing a secondary amine, for example dimethylamine, diethylamine, diethanolamine, N-methyl-cyclohexylamine or piperidine to react with this group and then adding an acid, for instance hydrochloric acid, formic acid, or acetic acid.

It is further possible to convert a carboxylic acid amide group containing at least one free hydrogen atom already present in the dyestuffs to be used as parent materials, into a group of the general formula

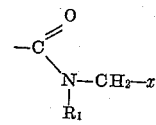

wherein $R_1$ is hydrogen or alkyl and $x$ is the radical of a thiourea, if desired in the form of a salt. For example the corresponding carboxylic acid-N-methylolamides may be caused to react for this purpose with thiourea according to the process of application Serial No. 251,848, filed January 19, 1939, appropriately in the presence of alcoholic hydrochloric acid and by moderately heating, preferably by using a solvent such as acetone.

If the dyestuffs to be used as parent materials contain a suitable substituent, for example amino or hydroxy groups, the group

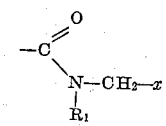

wherein $R_1$ and $x$ have the significance given in the first paragraph, may be introduced into the substituent, preferably by means of an alkylene bridge. Reactive dyestuffs, such as hydroxyazo-dyestuffs of the benzene series or amino-anthraquinones, for example 1:4-di-(para-aminophenyl)-amino-anthraquinone, may thus be caused to react with amides of halogen carboxylic acids, for instance chloroacetic acid amide, β-chloropropionic acid amide or α-bromobutyric acid amide, and the carboxylic acid amide group which must contain at least one free hydrogen atom at the nitrogen atom may be converted in the manner described above into the group

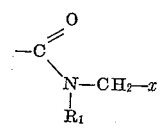

wherein $R_1$ and $x$ have the significance given in the first paragraph.

According to the present invention dyestuffs containing the group

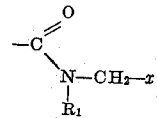

wherein $R_1$ and $x$ have the significance given in the first paragraph, may also be produced by coupling diazonium compounds with compounds capable of coupling containing the group

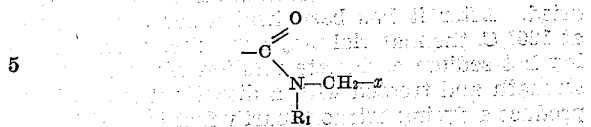

for example with quaternary ammonium compounds obtainable as described above from aromatic hydroxycarboxylic acid methylolamides, such as salicylic acid methylolamide.

The application of the dyestuffs obtained according to the present invention may be effected in such a manner that the material is treated in such solutions or dispersions of the dyestuffs in question which contain preferably catalysts such as weak acids or acid salts (formic acid, acetic acid, tartaric acid), for instance at 30–60°, and then heated, for example to 115–120° C. in the course of 1–2 hours. Further it is appropriate to add to the dye-baths salts of weak acids, for example sodium acetate, whereby injuries of the fiber are avoided. It is advantageous to dry the dyed material before heating, appropriately at a low temperature.

It is also possible to fix to the fiber dyestuff components capable of coupling or diazotizable coupling components which contain the above mentioned group

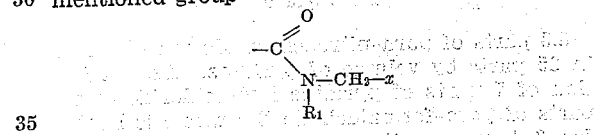

instead of dyestuffs with the group

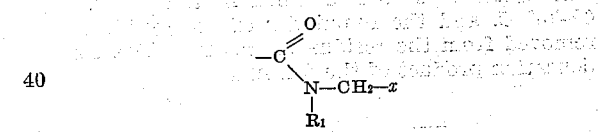

wherein $R_1$ and $x$ have the significance given in the first paragraph, heat the same, for example to 115–120° C. and then allow the dyestuff to be formed by coupling with diazotized amines or by diazotizing and coupling with a suitable coupling component.

Finally, compounds having no dyestuff character wherein the group

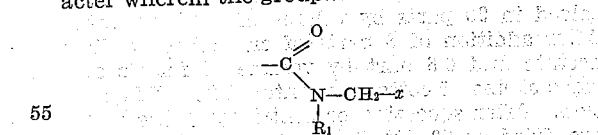

($R_1$ and $x$ having the significance stated in the 1st paragraph) is linked to a reactive radical, for example to an alkyl radical having reactive halogen atoms, may be brought onto the fiber and fixed thereon by heating, whereupon the reactive group is exchanged for dyestuff radicals. Thus the cellulose fiber treated with a compound of the formula

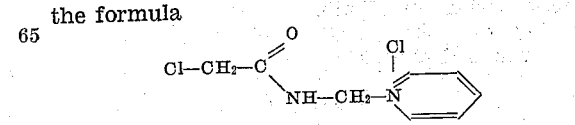

may be after-treated for example with aminoanthrachinones.

The dyestuffs of the present invention may be used for dyeing vegetable and animal fibrous materials or artificially produced fibers, such as cellulose or materials containing cellulose for instance cotton, viscose rayon, copper rayon, paper, wool, silk and mixed fibrous materials, for example in the form of threads or fabrics. Moreover materials of artificial fibers which contain cellulose or cellulose derivatives or protein substances may be treated.

Dyeings produced with dyestuffs of the present invention are characterized by good fastness properties, particularly by good fastness to washing. It is very probable that during heating a reaction occurs between the fiber, for example the cellulose fiber, and the group

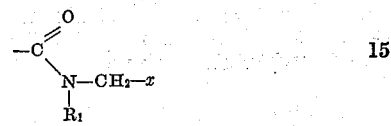

wherein $R_1$ and $x$ have the significance stated in the first paragraph, existing in the dyestuffs. Probably the radical $x$ lending solubility to water is split off, whereas the group

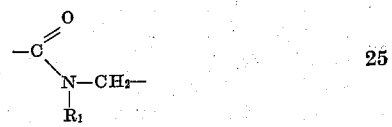

is united with the cellulose, presumably by the methylene group.

The products obtainable by the process may be used alone or together with other materials, for instance solvents, soapy substances, protective colloids, dressing agents such as methylol ureas and condensation products thereof, weighting, softening or matting agents.

The following examples illustrate the invention, the parts being by weight, the relationship of parts by weight to parts by volume is that which exists between the kilo and the liter.

*Example 1*

1.5 parts of dyestuff pigment from diazotized para-aminobenzoic acid amide and β-naphthol are dissolved in 35 parts by volume of pyridine. After addition of 0.2 parts of paraformaldehyde the whole is heated for 35 minutes on the water bath while stirring. There is then added 1.2 parts of pyridine hydrochloride and heating is continued for 3 hours at the same temperature. On cooling the dyestuff of the formula

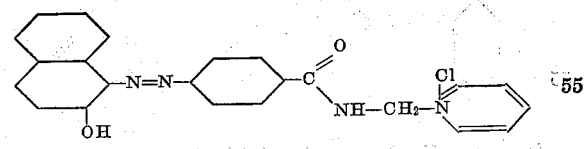

which is soluble in water crystallises in the form of small slender needles. After filtering and drying it is obtained in the form of an orange red powder which dissolves easily in water and dyes cotton directly orange red. For this purpose cotton fabric is dyed with 2 per cent of the weight of the fiber of the above described quaternary pyridinium chloride in presence of an equivalent quantity of sodium acetate.

The cotton preferably dried at a low temperature is heated for 1–2 hours at 115–120° C. There is thus obtained a dyeing of a high degree of fastness to washing. By the after-treatment by heat the fastness to washing is strongly increased as compared with that of the dyeing which has not been after-treated.

Instead of the above indicated carboxylic acid amide the corresponding amides in which one hydrogen atom of the carboxylic acid amide group is replaced by methyl, ethyl, propyl, may be used. Instead of pyridine triethyl amine may be used.

Example 2

3.2 parts of a dyestuff pigment from diazotized aniline and 1-phenyl-3'-carboxylic acid amide-3-methylpyrazolone are heated together with 1.4 parts of pyridinehydrochloride, 60 parts by volume of pyridine and 0.4 part of paraformaldehyde on the boiling water bath for 4 hours while stirring. The dyestuff first passes into solution and after a time the new pyridiniumchloride crystallises. After filtering and removing the pyridine the new dyestuff of the formula

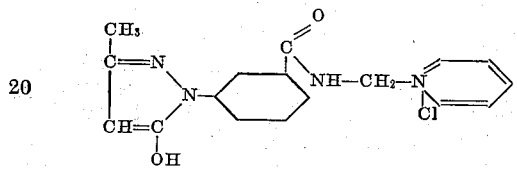

is obtained in the form of a yellow crystalline powder freely soluble in water. The new dyestuff may be applied in the following manner: Cotton fabric is dyed with 2 per cent of the weight of the fiber of the above described dyestuff in presence of an equivalent quantity of sodium acetate. The cotton preferably dried at a low temperature is heated at 115–120° C. for 1–2 hours. The dyeing thus obtained is of high fastness to washing. By after-treatment by heat the fastness to washing is strongly increased as compared with that of the dyeing which has not been after-treated.

It is further possible to use the N-monoalkyl-substituted carboxylic acid amides instead of the above mentioned unsubstituted amide.

Example 3

2.6 parts of the dyestuff from diazotized para-aminobenzamide and para-cresol are dissolved in 30 parts by volume of hot pyridine. To this solution are added while stirring 0.4 part of para-formaldehyde and 1.4 parts of pyridine hydrochloride, and the whole is heated for 3 hours on the boiling water-bath. On cooling the new dyestuff of the formula

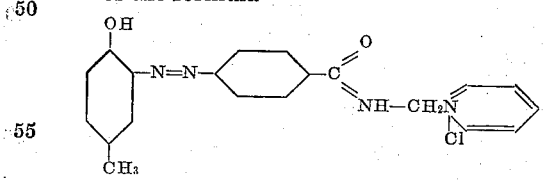

is crystallized. It is soluble in water and the aqueous solution is gradually decomposed on boiling. The material, for example cotton, is dyed appropriately according to the methods described in Examples 1 and 2, yellow tints being obtained.

Example 4

Cotton fabric is handled in an aqueous solution containing 5–10 per cent of the quaternary pyridinium chloride of the formula

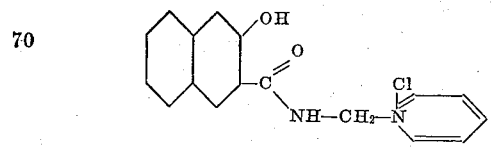

obtainable from β-oxynaphthoic acid amide formaldehyde and pyridine hydrochloride in presence of pyridine, sodium acetate and acetic acid being added; the impregnated material is squeezed and dried. After it has been heated for 1–2 hours at 120° C. the material may be washed with boiling hot sodium carbonate solution of 2 per cent strength and treated with a diazotized amine to produce a dyeing extraordinarily fast to washing.

Example 5

Cotton fabric is treated in the manner described in Example 4 with a solution of the quaternary pyridium chloride of the formula

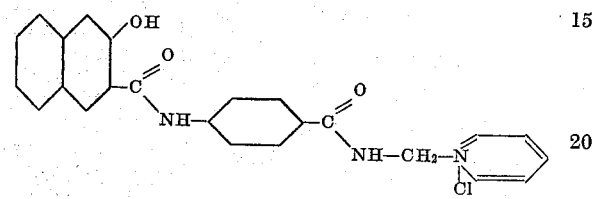

obtainable from para-(β-hydroxynaphthoyl)-aminobenzamide with formaldehyde and pyridine hydrochloride in presence of pyridine. The fabric thus treated and further treated as described in Example 4 may be dyed extraordinarily fast to washing by means of diazotized amine.

Example 6

8.3 parts of para-nitrobenzamide are dissolved in 25 parts by volume of pyridine. After addition of 7 parts of pyridine hydrochloride and 2 parts of para-formaldehyde the whole is heated for 3 hours on the vapor-bath while stirring. The pyridine is then distilled in a vacuum at 60–70° C. and the remainder of the pyridine is removed from the residue with ether. The condensation product of the formula

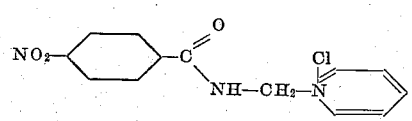

is a feebly yellow crystalline mass which is freely soluble in water and decomposes gradually when boiling the aqueous solution.

10 parts of this condensation product are dissolved in 90 parts by volume of distilled water. After addition of 8 parts of crystallized sodium acetate and 0.6 part by volume of formic acid some skeins of cotton are entered into this solution. After squeezing or centrifuging the skeins are dried at 50–60° C. and then heated to 115° C. in the course of 3 hours.

By treating the material with a hot soap solution and rinsing with boiling water that part of the condensation product is removed which is fixed mechanically.

A sample of the cotton treated in such a manner is dyed an intensive orange color after reduction with an alkaline hydrosulfite solution, rinsing, diazotizing and coupling with β-naphthol, which dyeing is fast to washing.

Example 7

10 parts of the dyestuff from diazotized para-amino-benzamide and β-naphthol are heated to 95–100° C. with 60 parts by volume of pyridine and 4 parts of para-formaldehyde, while stirring, and sulfur dioxide is passed through this mixture during 3 hours. After cooling the whole is filtered, and the residue triturated with warm pyridine, whereby unchanged dyestuff is removed. After squeezing off the pyridine the dyestuff is freed in a vacuum at 60° C. from the remaining pyridine. The product which is at first resinous becomes gradually powdery. The new dyestuff which corresponds very probably to the formula

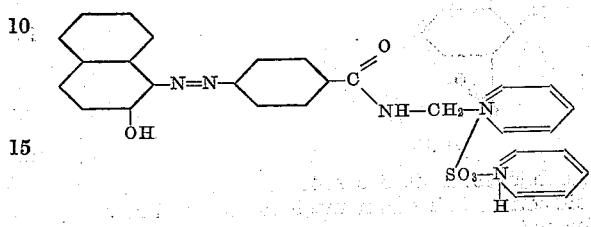

dissolves in hot water, but after boiling the solution for a short time the dyestuff is separated in jelly-like form.

*Example 8*

3.9 parts of the dyestuff from diazotized anthranilic acid-ethylester and the 1-phenyl-3-methylpyrazolone carboxylic acid amide-(3') are heated for 4 hours on the vapor bath with 60 parts by volume of pyridine, 0.4 part of paraformaldehyde and 1.4 parts of pyridine hydrochloride, while stirring. After cooling the new dyestuff of the formula

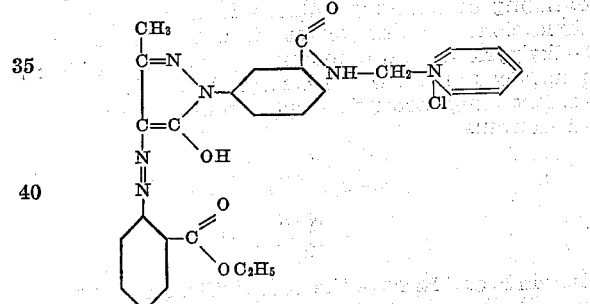

is crystallized. It can be obtained pure after filtering and washing with ether. It is an orange-yellow powder soluble in water. On boiling the aqueous solution becomes turbid after a short time and the dyestuff which at first is soluble becomes entirely insoluble.

What we claim is:

1. Dyestuffs of the general formula

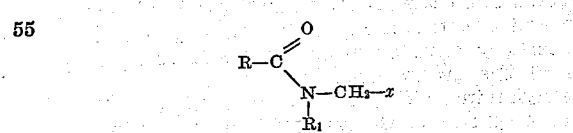

wherein R represents the radical of a dyestuff selected from a group consisting of radicals of azo and anthraquinone dyestuffs, R₁ stands for a member selected from the group consisting of hydrogen and alkyl and x stands for a member of the group consisting of quaternary ammonium groups, ternary sulfonium groups, amino and imino groups in the form of salts, thiourea residues in the form of salts, carboxylic acid, sulfonic acid, thiosulfuric acid and sulfuric acid ester groups and is united with the —CH₂— group by a member of the group consisting of nitrogen atoms and sulfur atoms, which dyestuffs are decomposed when their aqueous solutions are boiled.

2. Azo dyestuffs of the formula

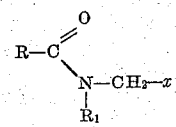

wherein R represents the radical of an azo-dyestuff, R₁ stands for a member selected from the group consisting of hydrogen and alkyl and x stands for a member of the group consisting of quaternary ammonium groups, ternary sulfonium groups, amino and imino groups in the form of salts, thiourea residues in the form of salts, carboxylic acid, sulfonic acid, thiosulfuric acid and sulfuric acid ester groups and is united with the —CH₂— group by a member of the group consisting of nitrogen atoms and sulfur atoms, which dyestuffs are decomposed when their aqueous solutions are boiled.

3. Azo dyestuffs of the formula

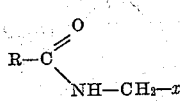

wherein R represents the radical of an azo dyestuff and x stands for a member of the group consisting of quaternary ammonium groups, ternary sulfonium groups, amino and imino groups in the form of salts, thiourea residues in the form of salts, carboxylic acid, sulfonic acid, thiosulfuric acid and sulfuric acid ester groups and is united with the —CH₂— group by a member of the group consisting of nitrogen atoms and sulfur atoms, which dyestuffs are decomposed when their aqueous solutions are boiled.

4. Azo dyestuffs of the formula

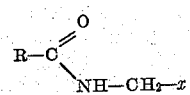

wherein R represents the radical of an hydroxyazo dyestuff and x stands for a member of the group consisting of quaternary ammonium groups, ternary sulfonium groups, amino and imino groups in the form of salts, thiourea residues in the form of salts, carboxylic acid, sulfonic acid, thiosulfuric acid and sulfuric acid ester groups and is united with the —CH₂— group by a member of the group consisting of nitrogen atoms and sulfur atoms, which dyestuffs are decomposed when their aqueous solutions are boiled.

5. Azo dyestuffs of the formula

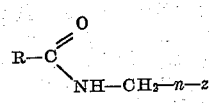

wherein R represents the residue of an hydroxyazo dyestuff, n stands for a quaternary nitrogen atom derived from a member of the group consisting of trimethylamine, triethylamine, diethylcyclohexylamine, dimethylaniline, pyridine, C-alkylpyridine and quinoline and z stands for a monovalent anion which dyestuffs are decomposed when their aqueous solutions are boiled.

6. Azo dyestuffs of the formula

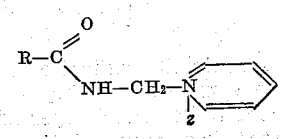

wherein R represents the radical of a hydroxyazo dyestuff and z stands for a monovalent anion which dyestuffs are decomposed when their aqueous solutions are boiled.

7. The hydroxyazo dyestuff of the formula

[Structural formula]

which dyestuff is decomposed when its aqueous solution is boiled, an insoluble compound being formed.

8. The hydroxyazo dyestuff of the formula

[Structural formula]

which dyestuff is decomposed when its aqueous solution is boiled, an insoluble compound being formed.

9. Azo dyestuffs of the formula $$R-C\overset{O}{\underset{NH-CH_2-x}{{=}}}$$

wherein R represents the radical of an azo-dyestuff containing a pyrazolone ring and $x$ stands for a member of the group consisting of quarternary ammonium groups, ternary sulfonium groups, amino and imino groups in the form of salts, thiourea residues in the form of salts, carboxylic acid, sulfonic acid, thiosulfuric acid and sulfuric acid ester groups and is united with the —CH$_2$— group by a member of the group consisting of nitrogen atoms and sulfur atoms, which dyestuffs are decomposed when their aqueous solutions are boiled.

10. Azo dyestuffs of the formula $$R-C\overset{O}{\underset{NH-CH_2-n-z}{{=}}}$$

wherein R represents the radical of an azo dyestuff containing a pyrazolone ring, $n$ stands for a quaternary nitrogen atom derived from a member of the group consisting of trimethylamine, triethylamine, diethylcyclohexylamine, dimethylaniline, pyridine, C-alkylpyridine and quinoline and $z$ stands for a monovalent anion, which dyestuffs are decomposed when their aqueous solutions are boiled.

11. Azo dyestuffs of the formula

[Structural formula]

wherein R represents the radical of an azo dyestuff containing a pyrazolone ring and $z$ stands for a monovalent anion which dyestuffs are decomposed when their aqueous solutions are boiled.

12. The azo dyestuff of the formula

[Structural formula]

which dyestuff is decomposed when its aqueous solution is boiled, an insoluble compound being formed.

13. The manufacture of dyestuffs of the general formula $$R-C\overset{O}{\underset{\underset{R_1}{N-CH_2-n-z}}{{=}}}$$

wherein R represents the radical of a dyestuff selected from the group consisting of radicals of azo and anthraquinone dyestuffs, $R_1$ stands for a member selected from the group consisting of hydrogen and alkyl, $n$ stands for a quaternary nitrogen atom derived from a member of the group consisting of trimethylamine, triethylamine, diethylcyclohexylamine, dimethylaniline, pyridine, C-alkylpyridine and quinoline and $z$ stands for a monovalent anion, which comprises reacting the corresponding carboxylic acid amides of the general formula $$R-C\overset{O}{\underset{\underset{R_1}{N-H}}{{=}}}$$

wherein R and $R_1$ have the above indicated meaning, with formaldehyde and a salt of a tertiary amine in the presence of a free tertiary amine.

14. The manufacture of dyestuffs of the general formula $$R-C\overset{O}{\underset{NH-CH_2-n-z}{{=}}}$$

wherein R represents the radical of a dyestuff selected from the group consisting of radicals of azo and anthraquinone dyestuffs, $n$ stands for a quaternary nitrogen atom derived from a member of the group consisting of trimethylamine, triethylamine, diethylcyclohexylamine, dimethylaniline, pyridine, C-alkylpyridine and quinoline and $z$ stands for a monovalent anion, which comprises reacting the corresponding carboxylic acid amide of the general formula $$R-C\overset{O}{\underset{NH_2}{{=}}}$$

wherein R has the above indicated meaning, with formaldehyde and a salt of a tertiary amine in the presence of a free tertiary amine.

15. The manufacture of dyestuffs of the general formula $$R-C\overset{O}{\underset{NH-CH_2-n-z}{{=}}}$$

wherein R represents the radical of an azo dyestuff, n stands for a quaternary nitrogen atom derived from a member of the group consisting of trimethylamine, triethylamine, diethylcyclohexylamine, dimethylaniline, pyridine, C-alkylpyridine and quinoline and z stands for a monovalent anion, which comprises reacting the corresponding carboxylic acid amide of the general formula

wherein R has the above indicated meaning, with formaldehyde and a salt of a tertiary amine in the presence of a free tertiary amine.

16. The manufacture of dyestuffs of the general formula

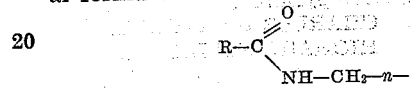

wherein R represents the radical of a hydroxyazo dyestuff, n stands for a quaternary nitrogen atom derived from a member of the group consisting of trimethylamine, triethylamine, diethylcyclohexylamine, dimethylaniline, pyridine, C-alkylpyridine and quinoline and z stands for a monovalent anion, which comprises reacting the corresponding carboxylic acid amide of the general formula

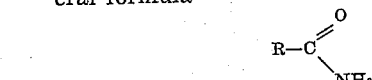

wherein R has the above indicated meaning, with formaldehyde and a salt of a tertiary amine in the presence of a free tertiary amine.

17. The manufacture of dyestuffs of the general formula

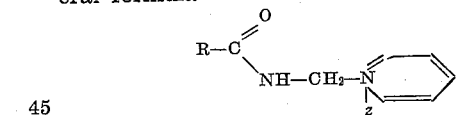

wherein R represents the residue of a hydroxyazo dyestuff and z stands for a monovalent anion, which comprises reacting the corresponding carboxylic acid amide of the general formula

wherein R has the above indicated meaning, with formaldehyde and a salt of pyridine in the presence of free pyridine.

18. The manufacture of the hydroxyazo dyestuff of the formula

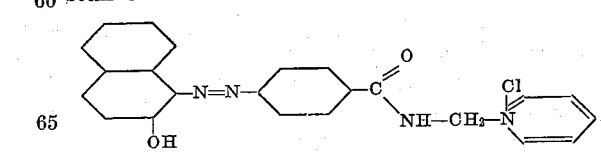

which comprises reacting the hydroxyazo dyestuff of the formula

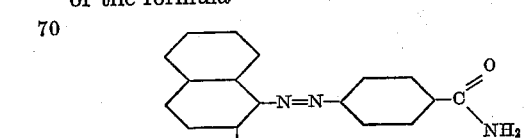

with formaldehyde and pyridine hydrochloride in the presence of free pyridine.

19. The manufacture of the hydroxyazo dyestuff of the formula

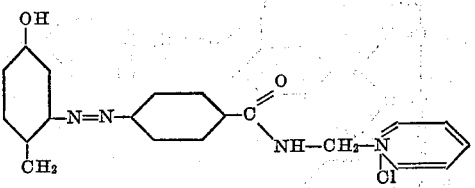

which comprises reacting the hydroxyazo dyestuff of the formula

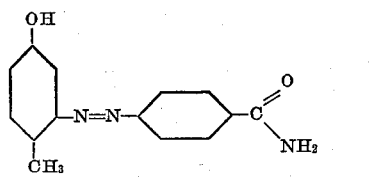

with formaldehyde and pyridine hydrochloride in the presence of free pyridine.

20. The manufacture of dyestuffs of the general formula

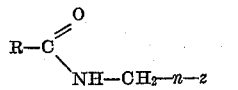

wherein R represents the radical of an azo dyestuff containing a pyrazolone ring, n stands for a quaternary nitrogen atom derived from a member of the group consisting of trimethylamine, triethylamine, diethylcyclohexylamine, dimethylaniline, pyridine, C-alkylpyridine and quinoline and z stands for a monovalent anion, which comprises reacting the corresponding carboxylic acid amide of the general formula

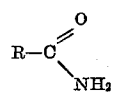

wherein R has the above indicated meaning, with formaldehyde and a salt of a tertiary amine in the presence of a free tertiary amine.

21. The manufacture of dyestuffs of the general formula

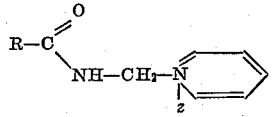

wherein R represents the radical of an azo dyestuff containing a pyrazolone ring and z stands for a monovalent anion, which comprises reacting the corresponding carboxylic acid amide of the general formula

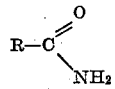

wherein R has the above indicated meaning, with formaldehyde and a salt of pyridine in the presence of free pyridine.
22. The manufacture of the azo dyestuff of the formula
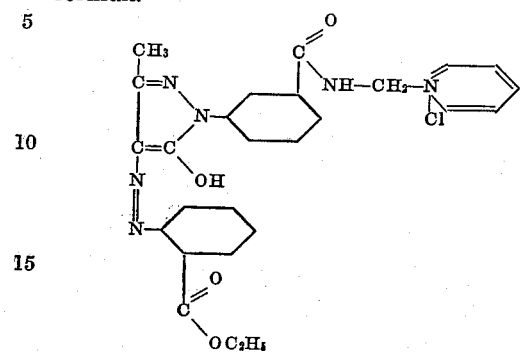
which comprises reacting the azo dyestuff of the formula
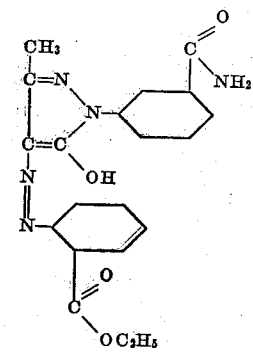
with formaldehyde and pyridine hydrochloride in the presence of free pyridine.
CHARLES GRAENACHER.
RICHARD SALLMANN.